Figure 1:
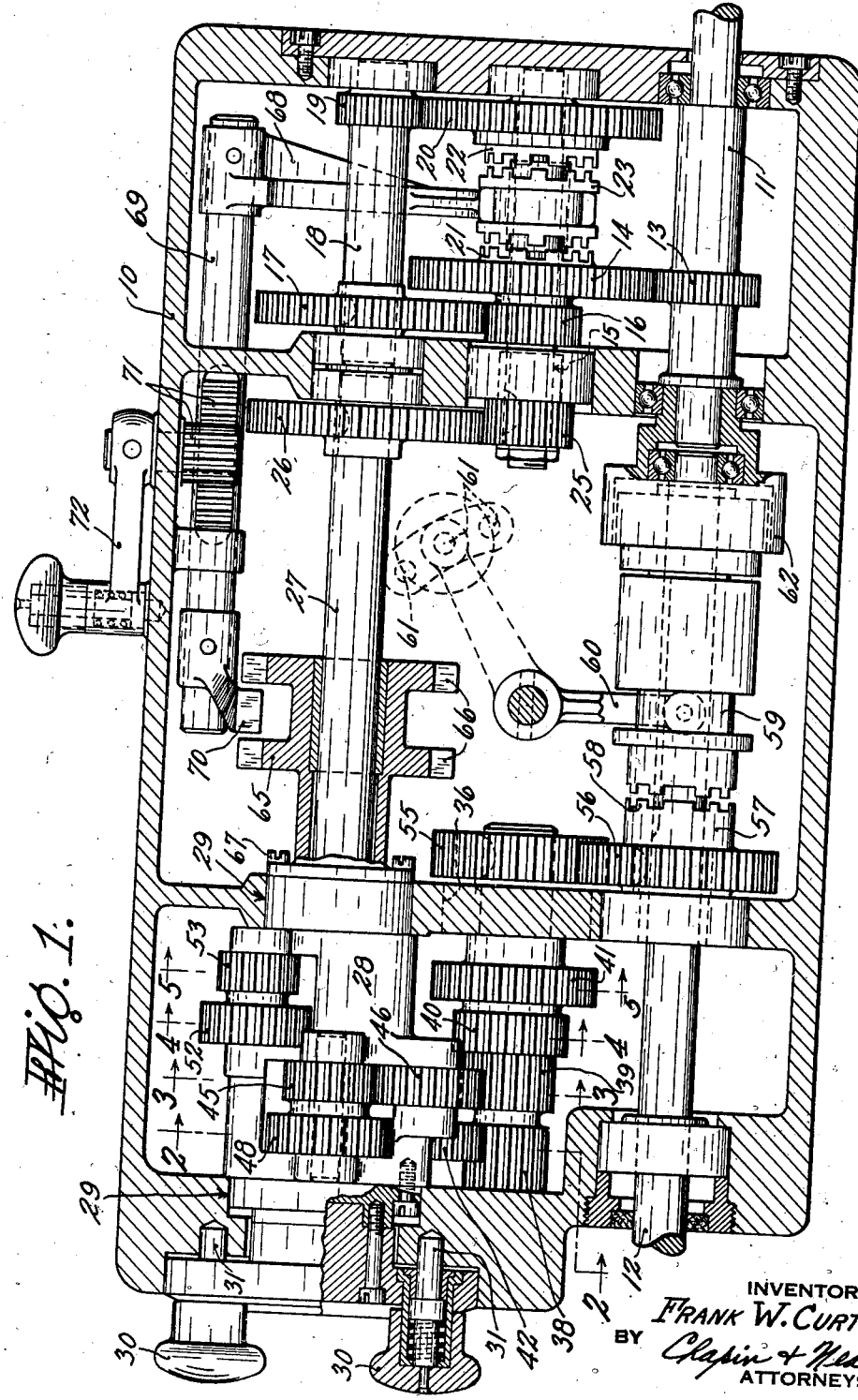

May 5, 1942.   F. W. CURTIS   2,281,921
TUMBLE-CHANGE GEAR MECHANISM
Filed Feb. 7, 1941   2 Sheets-Sheet 1

INVENTOR
Frank W. Curtis
BY Chapin & Neal
ATTORNEYS

May 5, 1942.  F. W. CURTIS  2,281,921
TUMBLE CHANGE GEAR MECHANISM
Filed Feb. 7, 1941  2 Sheets-Sheet 2
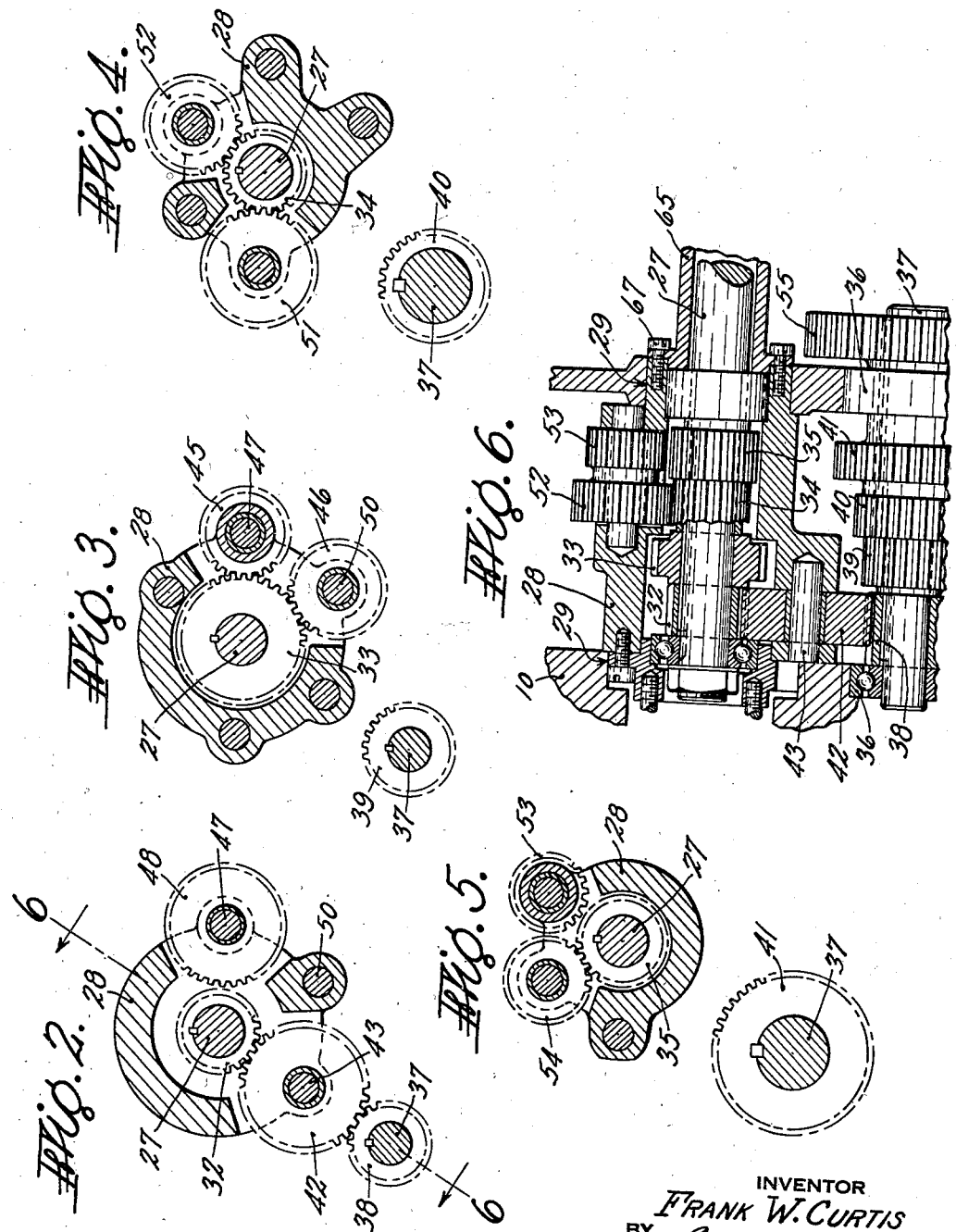
INVENTOR
FRANK W. CURTIS
BY Chapin + Neal
ATTORNEYS Patented May 5, 1942

2,281,921

UNITED STATES PATENT OFFICE 2,281,921

TUMBLE CHANGE GEAR MECHANISM

Frank W. Curtis, Springfield, Mass., assignor to Van Norman Machine Tool Company, Springfield, Mass., a corporation of Massachusetts Application February 7, 1941, Serial No. 377,773

6 Claims. (Cl. 74—353)

This invention relates to improvements in change gear mechanism of the tumbler type. It has for one object the provisions of an improved tumbler mechanism in which a greater number of speeds can be obtained from a given number of gears than has hitherto been the case. A further object is to provide an interlock for the tumbler which will prevent its rotation from one meshing position to another unless the power drive to the tumbler mechanism has been disconnected. A further object is to combine with the tubular mechanism a high and a low speed gear drive which will double the number of speeds possible to obtain from the tumbler mechanism itself and to interlock this high and low speed gear drive with the tumbler so that the tumbler cannot be adjusted unless the high and low gear drive is in neutral position. A further object of the invention is to improve tumbler gear mechanism by employing therein a particular form of gear tooth to prevent jamming of the gears during adjustment.

Referring to the drawings:

Fig. 1 is a sectional side elevation of a gear box employing the novel mechanism of the present invention;

Figs. 2, 3, 4 and 5 are sections respectively on lines 2—2, 3—3, 4—4, and 5—5 of Fig. 1; and Fig. 6 is a section on line 6—6 of Fig. 2.

The gear box 10 has a drive shaft 11 entering into it from one end and a shaft 12, preferably aligned therewith, which it is desired to operate at any one of a number of feed rates. While the gear box has not been shown in the drawings as being applied to any particular mechanism, the change gear mechanism may be used to advantage on such machine tools as milling machines. The shaft 11 carries a gear 13 meshing with a larger gear 14 freely rotatable on a shaft 15. Fixed to gear 14 is a pinion 16 meshing with a gear 17 secured to a shaft 18. On the latter shaft is a pinion 19 meshing with a gear 20 also freely mounted on the shaft 15. The gears 14 and 20 are provided with clutch teeth 21 and 22 respectively and are adapted to be engaged by corresponding clutch teeth on a clutch member 23 keyed to the shaft 15 for sliding movement thereon. Gears 16, 17, 19 and 20 form a back gear train so that if the clutch member 23 is engaged with the teeth 21 the shaft 15 will be driven at the same rate as the gear 14, whereas if it is engaged with the teeth 22 the shaft will be driven as the much slower rate of the gear 20.

The shaft 15 carries a pinion 25 fixed for rotation therewith and meshing with a gear 26 on a shaft 27. This shaft is suitably journaled in brackets in the gear box and has a cage 28 freely mounted for rotation upon it. This cage is journaled for rotation in the casing 10 as at 29 and has handles 30 each containing a spring pressed locking pin 31 by which the cage may be set in any one of six equally spaced angular positions each producing a different speed of rotation of shaft 12.

Upon this shaft 27 (Figs. 1 and 6), are keyed for rotation therewith a set of four gears 32, 33, 34, and 35 of different sizes. Parallel to the shaft 27 and journaled as at 36 in the frame is a short shaft 37 carrying a series of gears 38, 39, 40, and 41 coplanar with the gears 32, 33, 34, and 35 respectively. Meshing at all times with the gear 32 is a gear 42 journaled in the cage 28 on a short shaft 43 parallel to shaft 27. When the cage is rotated by handles 30 into the position shown in the drawings this gear 42 will be brought into mesh with the gear 38 on shaft 37.

In constant mesh with the gear 33 are two gears 45 and 46 respectively (Figs. 1, 3 and 6). Gear 45 is mounted on a shaft 47 parallel to shaft 27 and has formed integral with it a gear 48 lying in the plane of gears 42 and 38 (Fig. 2). When the cage 28 is rotated 120° from the position of Fig. 2, this gear 48 will be brought into mesh with the gear 38 previously mentioned. Due to the difference in size of the gears forming the train 32, 42, 38 and those forming the train 33, 45, 48, 38, the shaft 37 will be driven in the two cases at different rates of speed. The gear 46 is mounted on a short shaft 50 and when the cage is rotated 60° from the position of Fig. 3 will be brought into mesh with the gear 39. It should be noted that of the two gears 45 and 46 which are in mesh with the gear 33 in the plane of Fig. 3 one of them, that is the gear 46, is used as a direct drive for gear 39 in the same plane; while the other gear 45 drives a gear 48 in the preceding plane of Fig. 2, which in turn drives gear 38. This use of two gears in one plane to drive gears selectively in that plane or in a plane spaced from it forms one of the features of the invention and increases the number of speeds possible to obtain from a given number of gears on the drive shaft 27. By still further multiplying the gears driven from the shaft 27 in one plane and distributing their action to shaft 37 in different planes, a further increase in the number of feed speeds possible could be obtained up to a limit determined by the dimensions and therefore the capacity of the cage 28 to receive gears.

In the plane shown in Fig. 4 two gears 51 and 52 are driven from the gear 34. Gear 51 is adapted to engage a gear 40 on shaft 37 when the cage is rotated counterclockwise 60° from the position of Fig. 4. Gear 52, however, is coupled to a gear 53 lying in the plane of Fig. 5 and adapted to mesh with the gear 41 on shaft 37 when the cage is rotated 180° from the position of Fig. 5. A gear 54 in the plane of Fig. 5 is adapted to engage this gear 41 directly when the cage is rotating counterclockwise 120° from the position of Fig. 5. It will be seen from the foregoing description that by using the arrangement described in combination with the four gears on each of shafts 27 and 37, it is possible to obtain six different speed ratios. In addition, this number of ratios may be increased to twelve by shifting clutch member 23.

Motion from the shaft 37 at any one of these ratios is transmitted by a gear pair 55 and 56 to a sleeve 57 freely rotatable on shaft 12. Clutch teeth 58 rotatable with the gear 56 are adapted to be engaged by similar teeth on a sleeve 59 splined to the shaft 12 and reciprocable thereon by a shifter lever 60 having three positions 61, as indicated in dotted lines in Fig. 1. A clutch member 62, preferably of the friction type and coupled in driving relation to shaft 11 as shown, is also engageable with the sleeve 59 by lateral movement of this sleeve. By moving the shifter 60 to either of its extreme positions and thereby causing similar movements of sleeve 59 the shaft 12 may be driven at a high speed corresponding to that of shaft 11 or at any one of a number of low speeds corresponding to the settings of the clutch member 23 and the tumbler mechanism.

It is desirable that the tumbler mechanism should be rendered non-adjustable except when the shaft 27 is disconnected from the power source. For this purpose a double disk member 65 having notches 66 in each disk is secured at 67 to the tumbler cage 28. A clutch shifter member 68, which operates clutch 23, is mounted upon a slidable rod 69 having a finger 70 adapted to lie between the two disks on member 65 or to enter the notches 66 in either of them as will be clearly apparent from Fig. 1. As the rod 69 is reciprocated into any one of three positions by means of a rack and pinion connection 71 from a shifting lever 72, the finger 70 will be left between the disks or in engagement with one or the other of them in accordance with whether the clutch 23 is in its neutral position or is in engagement with one or the other sets of clutch teeth 21 and 22. It will be seen that by this means the tumbler mechanism will be locked positively so that it cannot be shifted unless the clutch 23 has previously been set in neutral position. With the tumbler mechanism thus disconnected from its power drive, the danger that the teeth of the gears 45, 46, 48, etc., mounted on the tumbler cage will become jammed with those of the gears on shaft 37, due to rotation of the former gears by power when the cage is rotated manually to engage these two sets of gears, is eliminated.

As a further refinement it has been found desirable that the teeth of the gears on shafts 27 and 37 and the teeth of the gears mounted on the tumbler cage shall be formed with a pressure angle of 30° instead of the usual angle which is generally in the neighborhood of 14° to 20°. The pressure angle is the acute angle between a line tangent to the base circles of the meshing gears and the common tangent to the pitch circles of the two gears when in mesh. It has been found that in the shifting of tumbler mechanism embodying gear teeth of the usual angle there is a tendency for the teeth to jam upon each other and to wear or undercut. If this is allowed to continue the teeth are very likely to wedge together when the cage is adjusted and cause bending of the shafts. By the use of teeth having a pressure angle of greater than about 24° and preferably 30°, this trouble is entirely avoided.

I claim:

1. A change speed drive mechanism comprising a driving shaft, a driven shaft parallel thereto, a plurality of non-meshing gear pairs arranged in axially spaced planes transverse to the shafts, one gear of each pair being fixed to the driving shaft and the other to the driven shaft, a cage mounted around the driving shaft for movement into a plurality of angular positions, and a plurality of gears arranged in the cage in spaced planes, a plurality of gears in certain of said planes meshing with a single gear on the driving shaft at least one of said gears meshing with a gear on the driven shaft, and a plurality of angularly separated gears in other planes meshable in different angular positions of the cage with a single gear on the driven shaft at least one of said gears meshing also with a gear on the driving shaft, each gear which meshes with a gear on the driving shaft but not directly with a gear on the driven shaft being coupled to drive a gear in another plane which does not mesh with a gear on the driving shaft but meshes with a gear on the driven shaft.

2. A change speed driving mechanism comprising a driving shaft, a driven shaft parallel thereto, a plurality of non-meshing coplanar gear pairs arranged in axially spaced planes transverse to the shaft, one gear of each pair being fixed to the driving shaft and the other to the driven shaft, a cage mounted around the driving shaft for movement into a plurality of angular positions, and a plurality of gears of different sizes located in spaced planes in angularly spaced relation, each gear in a plane meshing with a single gear on the driving shaft, one of said gears being of a diameter sufficient to cause it to mesh with the coplanar gear on the driven shaft and the other of said gear pair being of insufficient diameter to permit it to mesh with said coplanar gear, and a plurality of gears carried by the cage in intermediate alternating planes, one only of said gears meshing with the gear on the driving shaft in said plane and being of a sufficient diameter to cause it to mesh with the coplanar gear on the driven shaft, and the other gear of said pair being connected to be driven from a gear in a spaced plane and being of a diameter and with its axis so positioned as to mesh with a gear on the driven shaft when the cage is rotated into a suitable angular position, and being of insufficient diameter to mesh with the coplanar gear on the driving shaft.

3. A change speed drive mechanism comprising a driving shaft, a driven shaft parallel thereto, a plurality of non-meshing coplanar gear pairs arranged in axially spaced planes transverse to the shafts, one gear of each pair being fixed to the driving shaft and the other to the driven shaft, a cage mounted around the driving shaft for movement into a plurality of angular positions, and a plurality of gears arranged in the cage at each plane, a plurality of gears at certain planes meshing respectively with a single gear on the driving shaft, and a plurality of angularly separated gears at other stations being meshable in different angular positions of the cage with a single gear on the driven shaft, driving connections between at least some of said angularly separated gears and certain of the gears in other planes which mesh with gears on the driving shaft, and mechanism driven from the driven shaft and a direct connection between the driving shaft and the said mechanism by-passing said gearing.

4. A change speed drive mechanism comprising a power shaft, a driving shaft, gearing coupling the power shaft and the driving shaft together for rotation of the latter at a plurality of speeds, a clutch operable to connect said gearing to the driving shaft for rotation at either of said rates or to remain in a neutral position in which the power shaft is disconnected from the driving shaft, a plurality of gears on the driving shaft, a driven shaft, a plurality of gears thereon, a cage rotatable around the driving shaft into a plurality of angular positions, gearing carried by the cage selectively coupling the driving and driven shafts in said various angular positions, and mechanism coupling said clutch with the cage to lock the cage against rotation unless said clutch is in neutral position.

5. A change speed drive mechanism comprising a power shaft, a driving shaft, gearing coupling the power shaft and the driving shaft together for rotation of the latter at a plurality of speeds, a clutch operable to connect said gearing to the driving shaft for rotation at either of said rates or to remain in a neutral position in which the power shaft is disconnected from the driving shaft, a plurality of gears on the driving shaft, a driven shaft, a plurality of gears thereon, a cage rotatable around the driving shaft into a plurality of angular positions, gearing carried by the cage selectively coupling the driving and driven shafts in said various angular positions, and mechanism coupling said clutch with the cage to lock the cage against rotation unless said clutch is in neutral position, said coupling mechanism comprising a pair of spaced disks connected to the cage and having radial slots corresponding to the various angular positions of the cage, operating mechanism for the clutch, and a locking finger movable by said operating mechanism and positioned to rest between the disks when the clutch is in neutral position and to enter into slots in one or the other of said disks when the operating mechanism is shifted to cause engagement of the clutch.

6. A change speed driving mechanism comprising a driving shaft, a driven shaft parallel thereto, a plurality of non-meshing coplanar gear pairs arranged in axially spaced planes transverse to the shaft, one gear of each pair being fixed to the driving shaft and the other to the driven shaft, a cage mounted around the driving shaft for movement into a plurality of positions, and a plurality of gears of different sizes located in alternate planes in angularly spaced relation and both meshing with a common gear on the driving shaft in said plane, one of said gears being of a diameter sufficient to cause it to mesh with the coplanar gear on the driven shaft and the other of said gear pair being of insufficient diameter to permit it to mesh with said gear on the driven shaft, and a plurality of gears carried by the cage in intermediate alternating planes, one only of said latter gears meshing with the gear located on the driving shaft in said plane and being of a sufficient diameter to cause it to mesh with the coplanar gear on the driven shaft, and the other gear of said pair being connected to be driven from a gear in a spaced plane and being of a diameter and with its axis so positioned as to mesh with the coplanar gear on the driven shaft when the cage is rotated into a suitable angular position, and being of insufficient diameter to mesh with the coplanar gear on the driving shaft, said gears each having a pressure angle of at least 24°.

FRANK W. CURTIS.